Nov. 10, 1942.     L. TETREAULT     2,301,651
CONVEYING APPARATUS
Filed Feb. 7, 1941     2 Sheets-Sheet 1

Inventor
L'Homme Tetreault
By Bryant & Lowry
Attorneys

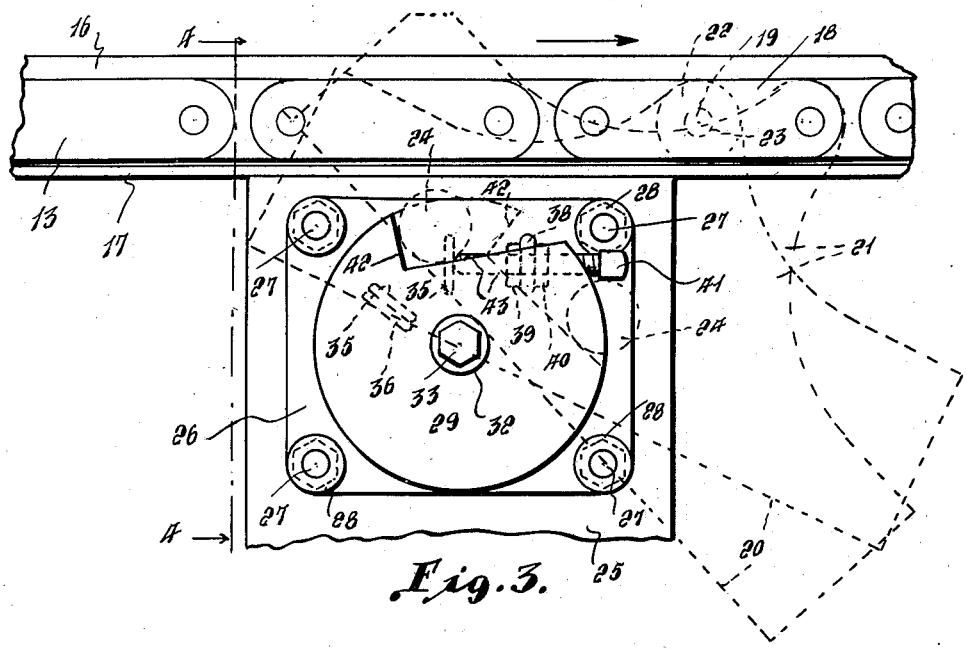

Patented Nov. 10, 1942

2,301,651

UNITED STATES PATENT OFFICE 2,301,651

CONVEYING APPARATUS

L'Homme Tetreault, Pawtucket, R. I.

Application February 7, 1941, Serial No. 377,934

5 Claims. (Cl. 198—155)

The present invention relates to conveying apparatus.

The primary object of the invention is to provide a conveyor which is adapted to be vibrated to remove articles therefrom at a predetermined station, whereby the articles will be prevented from sticking to the conveyor when it reaches its dumping position.

A further object of the invention is to provide a vibrating mechanism for a conveyor which is capable of being adjusted so that the vibration may be increased or decreased to insure the removal of articles from the conveyor at predetermined stations.

A still further object of the invention is to provide a vibrator associated with the conveying mechanism of a bread cooler which will allow the loaves of bread to be dumped and which will vibrate the bread tray to remove sticking loaves from the conveyor supporting trays.

A still further object of the invention is to provide dumping and vibrating mechanism for the conveyor of a bread cooler whereby the loaves will be dumped at their removal station to insure against excessive cooling resulting from the loaves sticking to the conveyor.

Other objects and advantages of the invention will become apparent during the course of the following description, taken with the drawings, wherein, Figure 1 is a side elevational view of the invention showing the vibrating mechanism with relation to one of the conveyor flights;

Figure 3 is an enlarged fragmentary side elevational view illustrating in detail the construction of the conveyor tray vibrator;

Figure 4 is a vertical cross-sectional view taken on line 4—4 of Figure 3, looking in the direction of the arrows, illustrating the manner in which the conveyor trays are initially tilted and vibrated after the tilting thereof; and Figure 5 is a top elevational view of one of the tripping and vibrating mechanisms on one side of the conveyor.

Figure 1:
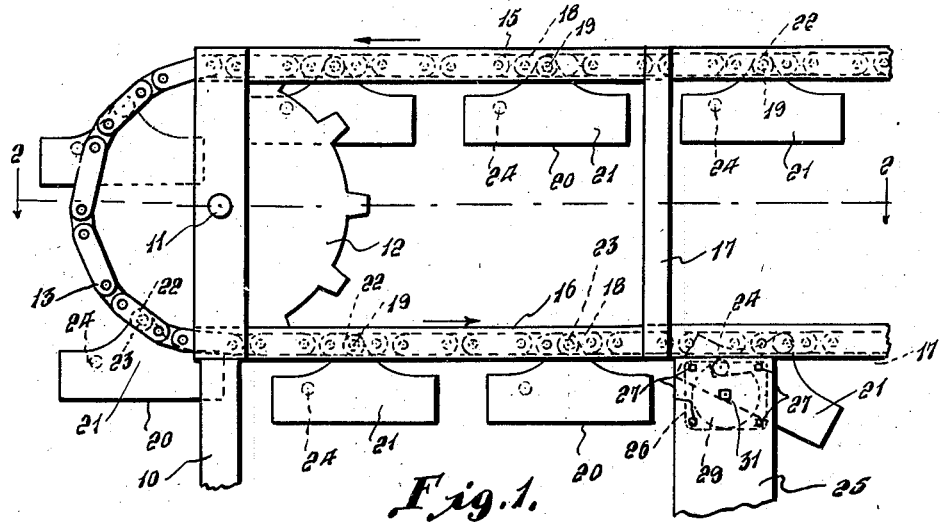
Figure 2:
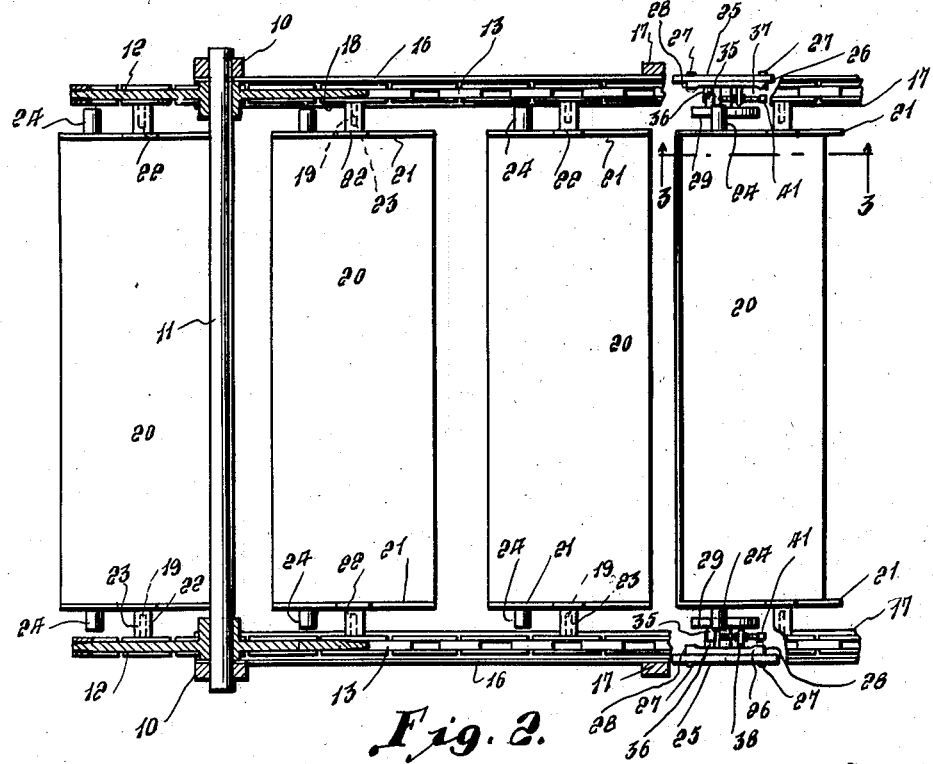
Figure 2 is a horizontal cross-sectional detail view taken on line 2—2 of Figure 1, looking in the direction of the arrows, showing the arrangement of the loaf receiving trays and the location of the vibrating mechanism therefor.

In the drawings, wherein for the purpose of illustrating the invention and wherein like reference characters will be employed to designate like parts throughout the same, the reference character 10 will generally designate a pair of vertical standards for supporting one end of a bread cooling conveyor cooling mechanism. The upper ends of the vertical standard 10 are provided with a horizontal shaft 11, the ends of which are suitably journaled therein and mounted on each end of the shaft 11 is a sprocket wheel 12 over which is adapted to pass a pair of parallel conveyor chains 13.

The opposite ends of the conveyor chains 13 are supported in a suitable manner, not shown, and are located to receive bread directly from the oven conveyor.

Secured to the top of the vertical standard 10 is a channel iron 15 having one of its flanges extending parallel with the conveyor flight and the other flange overlying underlying the conveyor chain 13 so that the top flight of the conveyor will assume a relatively straight position throughout its entire travel.

Similarly, a channel iron 16 is connected to the vertical standard 10 and extends parallel with the channel iron 15 so that its flange 17 may underlie the lower conveyor flight of each chain 13 and maintain the same in a horizontal position. A brace bar 17 has its ends connected to the angle irons 15 and 16 to support and hold the same in parallel spaced relation.

Connected to certain conveyor chain links, as at 18, is a pin 19 for supporting wooden trays 20 between the conveyor chains. Each wooden tray 20 is provided with an upstanding relatively short end wall 21 having outwardly extending tubular bosses 22 adjacent the upper ends thereof. The tubular bosses are provided with openings 23 which are adapted to receive the chain link pins 19 so that the trays 20 may swing on the pivot pins 19 as shown in Figures 1 and 3.

Each tray is provided at its ends with outwardly projecting studs 24 attached to the rear of the vertical median line of each tray.

Intermediate the ends of the conveyor, and on each side thereof, there is provided a vertical standard 25, the lower end of which is suitably supported and the upper end of which is provided with a rectangular plate 26 held in place by machine screws 27 extending through the vertical standard and anchored in threaded bosses 28 formed at the corners of the rectangular plate 26.

The tilting and vibrating mechanism comprises a disk 29 mounted on a spindle 30, one end of which is squared as at 31 for anchoring in a squared opening in the center of the rectangular plate 26. The disk 29 is mounted to rotate freely on the spindle 30 and is held in place by means of a washer 32 and nut 33 threaded on the inner end of the spindle 31. A spacing collar 34 is mounted on the spindle 30 between the disk 29 and plate 26 to prevent lateral movement of the disk.

It is to be noted that the disk 29 is placed in the path of movement of the pins 24 carried by the end walls 21 of the tray 20 so that the disk will be engaged thereby during the travel of the lower conveyor flight.

A stop lug 35 is formed integral with the disk 29 and is adapted to cooperate with the lug 36 carried by the rectangular plate 26 so that the motion of the disk 29 in one direction will be limited. The rotation of the disk in the opposite direction is limited by means of an adjustable screw 37 carried by a lug 38 formed integrally with the rectangular plate 26 and the adjustable screw 37 is provided with nuts 39 and 40 threaded thereon on opposite sides of the lug 38. A squared end 41 on the adjusting screw 37 is adapted to receive a wrench or the like for effecting adjustment when desired.

The periphery of the disk 29 is provided with a notch having relatively short and long right-angularly disposed surfaces 42 and 43, respectively as is clearly shown in Figures 1 and 3. The lower flight of the endless conveyor traveling in the direction of the arrow as shown in Figure 3 has the trays 20 so related to the disks 29 as to position the tray pins 24 in a plane above the axis of the disk 29 and below the upper edge of the disk. The tray pins move into engagement with the peripheral edge of the disks 29 and rotate the latter a distance limited by the stops 35 on the disks moving into engagement with the adjustable stop screws 37. During this rotation of the disks 29, the pins 24 carried by the trays will be moved in an upward direction to effect the movement of the trays 20 into the tilted dotted line positions shown in Figure 3. Continued movement of the endless conveyors and trays after the disks have been arrested in their rotative movements by the coacting stop members causes the tray pins to ride over the peripheral surface of the disk and drop into the notches between the surfaces 42 and 43, resulting in vibratory motion being imparted to the trays.

After the pin 24 is released from the inclined surface 43 of the disk 29, the disk returns by gravity to the position which it originally assumed whereby the lug 35 carried by the disk engages the lug 36 carried by the rectangular plate 26, while the tray pendulously assumes its normal horizontal position.

Upon the continued travel of the conveyor, the next tray 20 is likewise tilted for the removal of the bread loaves therefrom followed by a vibration of the tray which will remove sticking loaves so that the following tilting will insure the dumping of the loaves at the dumping station.

It will be obvious that the operation of the tilting and vibrating device is entirely automatic, while at the same time being positive in operation by the continuous travel of the endless conveyor.

It is to be understood that the form of the invention herewith shown and described may be taken as a preferred embodiment of the same and that various changes in the shape, size and arrangement of parts may be resorted to without departing from the spirit of the invention or the scope of the sub-joined claims.

I claim:

1. In combination with a conveyor having a series of tiltable trays, each tray having a lug formed adjacent one end thereof, a rotatable disk adapted to be engaged by the lug, means for limiting rotation of the disk in both directions and said disk being provided with a notch in its periphery for receiving the lug formed on the tray to impart vibration thereto after the carrier has been initially tilted.

2. In combination with a conveyor having tiltable tray and a lug formed on each tray, a rotatable disk mounted adjacent the tray having a notch in its periphery adapted to be engaged by the lug, means for limiting rotation of the disk in both directions and adjustable means for limiting the rotation of the disk in one of the rotary directions.

3. In combination with a conveyor having trays tiltably mounted thereon, an oscillatable disk adapted to be engaged by said trays for producing tilting movements of the trays, means for limiting oscillatory movements of the disk said disk having a notch in the periphery thereof for receiving a portion of each tray as it reaches a predetermined station relative to said disk to produce vibratory movements of the trays.

4. In combination with a coveyor having trays tiltably mounted thereon, a pin projecting laterally of each tray, an oscillatable disk located adjacent the conveyor adapted to be peripherally engaged by said pins for effecting initial tilting movements of the trays and said disk having a notch for subsequently receiving the pins carried by the trays to produce final vibratory movements of the trays for the removal of articles thereon and means for limiting oscillatory movements of the disk.

5. In combination with a conveyor having tiltable trays arranged thereon in spaced relation, a pin projecting from the ends of each tray, an oscillating disk at each side of the conveyor adapted to be peripherally engaged by the adjacent pins for effecting initial tilting of the trays, each of said disks having a notch into which the adjacent pins carried by each tray subsequently drop to produce vibratory movements of the trays and means for limiting rotation of the disks as the trays pass thereover.

L'HOMME TETREAULT.